US012775252B2

(12) United States Patent
Mathew et al.

(10) Patent No.: US 12,775,252 B2
(45) Date of Patent: Oct. 27, 2026

(54) SYSTEMS AND METHODS FOR AUDIO ANALYTICS

(71) Applicant: Elo Touch Solutions, Inc., Knoxville, TN (US)

(72) Inventors: Shilpa Mary Mathew, Milpitas, CA (US); Fareed Uddin, San Jose, CA (US)

(73) Assignee: Elo Touch Solutions, Inc., Knoxville, TN (US)

( * ) Notice: Subject to any disclaimer, the term of this patent is extended or adjusted under 35 U.S.C. 154(b) by 168 days.

(21) Appl. No.: 18/773,131

(22) Filed: Jul. 15, 2024

(65) Prior Publication Data

US 2026/0016797 A1 Jan. 15, 2026

(51) Int. Cl.

| | |
|---|---|
| ***G05B 13/04*** | (2006.01) |
| ***G06Q 20/20*** | (2012.01) |
| ***H04R 1/40*** | (2006.01) |
| ***H04R 3/00*** | (2006.01) |
| ***H04R 3/04*** | (2006.01) |

(52) U.S. Cl.
CPC ......... *G05B 13/042* (2013.01); *G06Q 20/202* (2013.01); *H04R 1/406* (2013.01); *H04R 3/005* (2013.01); *H04R 3/04* (2013.01)

(58) Field of Classification Search
CPC .... G05B 13/042; G06Q 20/202; G06Q 20/20; H04R 1/406; H04R 3/005; H04R 3/04; G07G 1/0036
See application file for complete search history.

(56) References Cited

U.S. PATENT DOCUMENTS

2013/0344788 A1* 12/2013 Buch .................... H05B 1/0236 454/75
2014/0217185 A1* 8/2014 Bicknell .................. F24F 11/52 236/1 C
2018/0202686 A1* 7/2018 Ahuja ....................... F24F 11/62
2019/0214019 A1* 7/2019 White ........................ G01S 3/80
2020/0141608 A1* 5/2020 Sinha ........................ F24F 11/74
2022/0205664 A1* 6/2022 Bondalapati ........... H04R 3/005

* cited by examiner

*Primary Examiner* — Christopher W Carter
(74) *Attorney, Agent, or Firm* — Sterne, Kessler, Goldstein & Fox P.L.L.C.

(57) ABSTRACT

A system configured to record a quantity of touchscreen/display inputs and a sound level emanating from a monitored environment. A method for adjusting environmental conditions based on a correlation between the quantity of touchscreen/display inputs and sound level. A non-transitory computer readable medium configured to record the touch-screen/display inputs and sound level in the monitored environment, provide correlation data, and recommend adjustments to the monitored environment.

20 Claims, 5 Drawing Sheets

SYSTEMS AND METHODS FOR AUDIO ANALYTICS

BACKGROUND OF THE INVENTION

Field of the Invention

Embodiments of the invention relate, generally, to point of sale systems, and in particular, to point of sale systems implemented with microphones for performing audio analytics for passively monitoring user activity within a monitored environment.

Background Art

Current monitoring and surveillance systems, when implemented in trafficked areas, may allow for monitoring of video and audio signals corresponding to the level of human activity, e.g., counting people, in their businesses (e.g., retail operations, restaurants, or the like). A known method for doing so is for cloud software to process images from cameras implemented as part of the monitoring and surveillance systems. While cameras sending video data to the cloud can generate useful analytics about the number of people entering or passing by a business, customers may not like it due to real or perceived privacy issues. Cameras may be perceived as an invasion of privacy.

Additionally, counting customers from on camera image processing is computationally intensive and typically performed in a cloud-computing environment (e.g., at a remote data processing center) rather than "on the edge" or in an edge-computing environment (e.g., on devices in the business). Camera images sent to the cloud can be difficult to track and thus assure that customer images are not misused. There exists a need for a less invasive monitoring and surveillance system and method.

BRIEF SUMMARY OF THE INVENTION

System, method, and computer program embodiments of a sound analytic system configured for passive monitoring of user activity using audio analytics are provided herein. In some embodiments, the sound analytic system may be implemented with a combination of a touchscreen and display, such as a touchscreen implemented over a display. For the purpose of this disclosure, this combination of a touchscreen and display will be referred to as touchscreen/display. Some embodiments of the sound analytic system can include a plurality of point of sale systems disposed in a monitored environment, the plurality of point of sale systems including a first point of sale system and a second point of sale system, a plurality of microphones configured to capture a diagnostic sound data from the monitored environment, the plurality of microphones including a first microphone and a second microphone, the monitored environment including a plurality of zones including a first zone and a second zone, wherein the first point of sale system and the first microphone are associated with the first zone, and the second point of sale system and the second microphone are associated with the second zone, wherein the first zone can include a first physical location within the monitored environment and the second zone can include a second physical location within the monitored environment; and a processor communicably coupled to the plurality of point of sale systems and the plurality of microphones. In some embodiments, the processor can be configured to receive the diagnostic sound data from the plurality of microphones, generate a sound analytic data based on the diagnostic data corresponding to sound received from the first microphone in the first zone and received from the second microphone in the second zone, output the sound analytic data to an audio analytics application embedded within the processor, the audio analytics application configured to interpret the sound analytics data as a function of volume, delete the diagnostic sound data after the generating the sound analytic data, generate instructions for controlling an environmental attribute control system communicably coupled to the processor based on the sound analytic data interpreted by the audio analytics application, and transmit the instructions to the environmental attribute control system to adjust an environmental attribute based on the interpreted sound analytics data. In some embodiments, the point of sale system can include a user interface device (e.g., a touchscreen display device). In some embodiments, the at least one microphone comprises a low pass filter that can be configured to perform the filtering step. In further embodiments, the processor can be configured to record a baseline sound data from the microphone (e.g., sound recorded from the monitored environment including music, heating, venting, and air conditioning (HVAC) system sound, equipment sound, or any combination thereof). In some embodiments, the processor can be configured to remove the baseline sound data from the diagnostic sound data to generate a sound analytic data. In some embodiments, the processor can be configured to incorporate a machine learning model to implement the environmental adjustments.

In some embodiments, a method for adjusting one or more environmental conditions is described herein. Some embodiments of the method can include recording a baseline sound data from a monitored environment from a plurality of microphones or from a plurality of point of sale systems, the plurality of microphones including a first microphone and a second microphone, the plurality of point of sale systems including a first point of sale system and a second point of sale system, the monitored environment including a plurality of zones including a first zone and a second zone, wherein the first point of sale system and the first microphone are associated with the first zone, and the second point of sale system and the second microphone are associated with the second zone, recording diagnostic sound data from the monitored environment, wherein the recording diagnostic sound data from the monitored environment can include recording sound generated from the first zone, wherein the first zone includes a first physical location within the monitored environment and the second zone can include a second physical location within the monitored environment, removing the baseline sound data from the diagnostic sound data recorded from the monitored environment to generate a sound analytic data corresponding to the sound generated from the first zone and the second zone, outputting the sound analytic data to an audio analytics application embedded within the processor, the audio analytics application configured to interpret the sound analytics data as a function of volume, deleting the diagnostic sound data, generating instructions for controlling an environmental attribute control system communicably coupled to the processor based on the sound analytic data interpreted by the audio analytics application, and transmitting the instructions to the environmental attribute control system to adjust an environmental attribute based on the interpreted sound analytics data. In some embodiments, the method can also include receiving input data from the point of sale system and correlating the input data and the sound analytic data to provide a correlated data. In some embodiments, the correlating can performed using a processor deployed in the monitored environment and communicably coupled to the point of sale system or the at least one microphone. In some embodiments, the method can further include outputting the correlated data to the audio analytics application. In some embodiments, adjusting the environmental conditions can include adjusting music volume, heating, venting, and air conditioning (HVAC) conditions, quantity of staff, quantity of supplies, or any combination thereof.

In some embodiments, a non-transitory computer readable medium can be configured to record a baseline sound data from a monitored environment from a plurality of microphones disposed in a monitored environment, the plurality of microphones including a first microphone and a second microphone, the monitored environment including a plurality of zones including a first zone and a second zone, wherein the first microphone is associated with the first zone, and the second microphone is associated with the second zone, record a diagnostic sound data from the monitored environment generated from the first zone, wherein the first zone can include a first physical location within the monitored environment and the second zone can include a second physical location within the monitored environment, remove the baseline sound data from the diagnostic sound data recorded from the monitored environment to generate a sound analytic data corresponding to the sound generated from the first zone and the second zone, output the sound analytic data to an audio analytics application embedded within the processor, the audio analytics application configured to interpret the sound analytics data as a function of volume, delete the diagnostic sound data after the generating the sound analytic data, generate instructions for controlling an environmental attribute control system communicably coupled to the processor based on the sound analytic data interpreted by the audio analytics application, and transmit the instructions to the environmental attribute control system to adjust an environmental attribute based on the interpreted sound analytics data. In some embodiments, the non-transitory computer readable medium can be located in the monitored environment and communicably coupled to a point of sale device comprising a touchscreen user interface. In some embodiments, the non-transitory computer readable medium can be communicably coupled to a plurality of microphones and a plurality of point of sale devices deployed in the monitored environment. In some additional embodiments, the non-transitory computer readable medium can be configured to record user input data from the point of sale device and correlate the user input data to the sound analytic data.

These as well as additional features, functions, and details of various embodiments are described below. Similarly, corresponding and additional embodiments are also described below.

BRIEF DESCRIPTION OF THE DRAWINGS/FIGURES

Aspects of this disclosure are best understood from the following detailed description when read with the accompanying figures. It is noted that, in accordance with the common practice in the industry, various features are not drawn to scale. In fact, the dimensions of the various features may be arbitrarily increased or reduced for clarity of discussion.

DETAILED DESCRIPTION OF THE INVENTION

Figure 1:
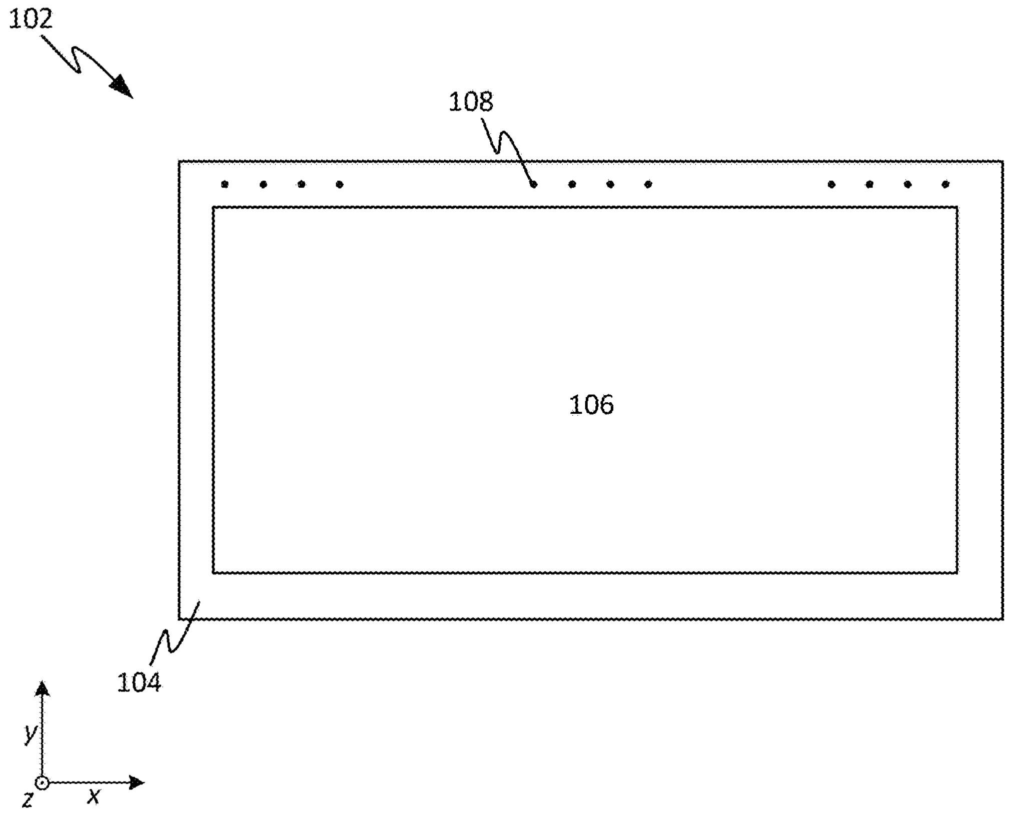
FIG. 1 illustrates a point of sale system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the process for forming a first feature over a second feature in the description that follows can include embodiments in which the first and second features are formed in direct input, and can also include embodiments in which additional features can be formed between the first and second features, such that the first and second features cannot be in direct input. As used herein, the formation of a first feature on a second feature means the first feature is formed in direct input with the second feature. In addition, the present disclosure can repeat reference numerals and/or letters in the various examples. This repetition does not in itself dictate a relationship between the various embodiments and/or configurations discussed.

Spatially relative terms, such as "beneath," "below," "lower," "above," "upper," and the like can be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus can be otherwise oriented (rotated 90 degrees or at other orientations) and the spatially relative descriptors used herein can likewise be interpreted accordingly.

It is noted that references in the specification to "one embodiment," "an embodiment," "an example embodiment," "exemplary," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to affect such feature, structure or characteristic in connection with other embodiments whether or not explicitly described.

It is to be understood that the phraseology or terminology herein is for the purpose of description and not of limitation, such that the terminology or phraseology of the present specification is to be interpreted by those skilled in relevant art(s) in light of the teachings herein.

In some embodiments, the terms "about" and "substantially" can indicate a value of a given quantity that varies within 5% of the value (e.g., ±1%, ±2%, ±3%, ±4%, ±5% of the value). These values are merely examples and are not intended to be limiting. The terms "about" and "substantially" can refer to a percentage of the values as interpreted by those skilled in relevant art(s) in light of the teachings herein.

As used herein, the meaning of "a," "an," and "the" includes singular and plural references unless the context clearly dictates otherwise.

All ranges disclosed herein are to be understood to encompass any and all endpoints as well as any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

The term "and/or" when used in a list of two or more items, means that any one of the listed items can be employed by itself or in combination with any one or more of the listed items. For example, the expression "A and/or B" is intended to mean either or both of A and B, i.e., A alone, B alone, or A and B in combination. The expression "A, B and/or C" is intended to mean A alone, B alone, C alone, A and B in combination, A and C in combination, B and C in combination or A, B, and C in combination.

FIG. 1 illustrates a point of sale system 102 according to some example embodiments of the present disclosure. The point of sale system 102 can include a frame 104, a touchscreen/display 106, and at least one microphone 108. In some embodiments, point of sale system 102 can include a plurality of microphones (e.g., an array of microphone 108).

Some embodiments include a touchscreen system that can be configured to record a quantity of inputs and generate input data. The touchscreen system may be based on projected capacitive (PCAP) touchscreen technology, resistive touchscreen technology, infrared touchscreen technology, or any other known touchscreen technology. The quantity of inputs can be inputs on the touchscreen from a finger, a card, a stylus, any suitable input source, or any combination thereof. Here "quantity of inputs" can be any measure of touch activity. The quantity of inputs can be the touch input frequency, e.g., the number of touches per unit of time. As an example of an alternate measure of the quantity of inputs, it may be an estimate of the number of different users using the touchscreen based on distinct clusters of touch activity.

In some aspects, microphone 108 can be configured to capture a diagnostic sound data from a monitored environment. For example, the monitored environment can be any environment in which user activity can be monitored. In some embodiments, monitored environments may be divided into a plurality of zones for monitoring user activity in the different zones. In some embodiments, each zone of the environment may be implemented with one or more point of sale systems of the present disclosure for passively monitoring user activity within their respective zones. Here, "microphone" is to be understood to include a physical sound-to-electrical signal transducer and associated signal processing of the audio signal.

A processor (not shown) can be disposed within a housing defined by frame 104 and communicably coupled to touchscreen/display 106 and at least one microphone 108. In some embodiments, the processor can be disposed in a local server, a control computer connected to the point of sale system over a local area network (LAN), a cloud-based server, or any combination thereof. The processor can be configured to record a baseline sound data from microphone 108, wherein the baseline sound data comprises ambient sound emanating from the monitored environment. In some examples, ambient sound can be sound recorded in a retail space within an hour before opening or an hour after closing. Ambient sound can be sound recorded overnight in the example of an entity that is not open twenty-four hours per day. In other examples, ambient sound can be recorded during a predetermined time period (e.g., slow business period). As one non-limiting example, ambient sound can be recorded over a period of about a number of hours prior to a predetermined event (e.g., the business opening). In some embodiments, the baseline sound data can include any sound not typically associated with user activity, such as music, heating, venting, and air conditioning (HVAC) system sound, equipment sound, or any combination thereof. The processor can be configured to remove the baseline sound data from the sound data captured from the monitored environment to generate sound analytic data.

In some embodiments, microphone 180 can be configured to filter frequencies greater than a predetermined conversation level (e.g., a threshold frequency level) from the diagnostic sound data to provide filtered sound data. For example, the threshold frequency level can be a frequency level below which speech is unrecognizable. As a non-limiting example, a threshold frequency level of 1 kHz can be used because recording monitored environment sound only at frequencies less than about 1 kHz can provide filtered sound data that is devoid of discernable conversation. Low-pass filtering may be accomplished with hardware circuitry or via digital signal processing (DSP). Not limited to low-pass filtering, digital signal processing (DSP) may in a variety of ways render sound analytic data devoid of discernable conversation. Thus, point of sale system 202 can be configured to maintain customer privacy by excluding audible conversation while maintaining sufficient audio information to perform sound analytics.

In some embodiments, point of sale system 102 can include a processor configured to receive the input data from the touchscreen system, receive the diagnostic sound data from the at least one microphone, and filter the frequencies greater than about 1 kiloHertz (kHz) from the diagnostic sound data. Accordingly, the processor can provide an input data set and a filtered sound data set. In some embodiments, point of sale system 102 can use the processor to correlate the input data and the filtered sound data to generate an occupancy profile of a monitored environment (e.g., a physical store) at any desired moment in time. For example, a high quantity and/or a high frequency of inputs on the touchscreen and a large amplitude of filtered sound data can indicate a busy time in the monitored environment. Conversely, infrequent inputs on the touchscreen and small amplitude filtered sound data can indicate a slow time in the monitored environment.

In some embodiments, the processor can be configured to delete the filtered sound data after the correlating. Deleting the filtered sound data (or any stored sound data) can further ensure to the customer that any data recorded from a visit to a monitored environment is erased, thus preventing the sound data from being used in subsequent applications which results in decreased customer privacy.

The point of sale system 102 can include a base configured to support a stand, the stand configured to support a housing, the housing configured to support the touchscreen, the at least one microphone, and the processor. As such, the point of sale system 102 can be a freestanding system. In some embodiments, the freestanding point of sale system 102 can be an "on the edge" system deployed within the monitored environment. An on the edge point of sale system 102 can perform data processing without a need to send data to a cloud-computing environment for processing. Performing on the edge processing can still further ensure to the customer that data is secure, destroyed, and privacy is maintained.

Figure 2:
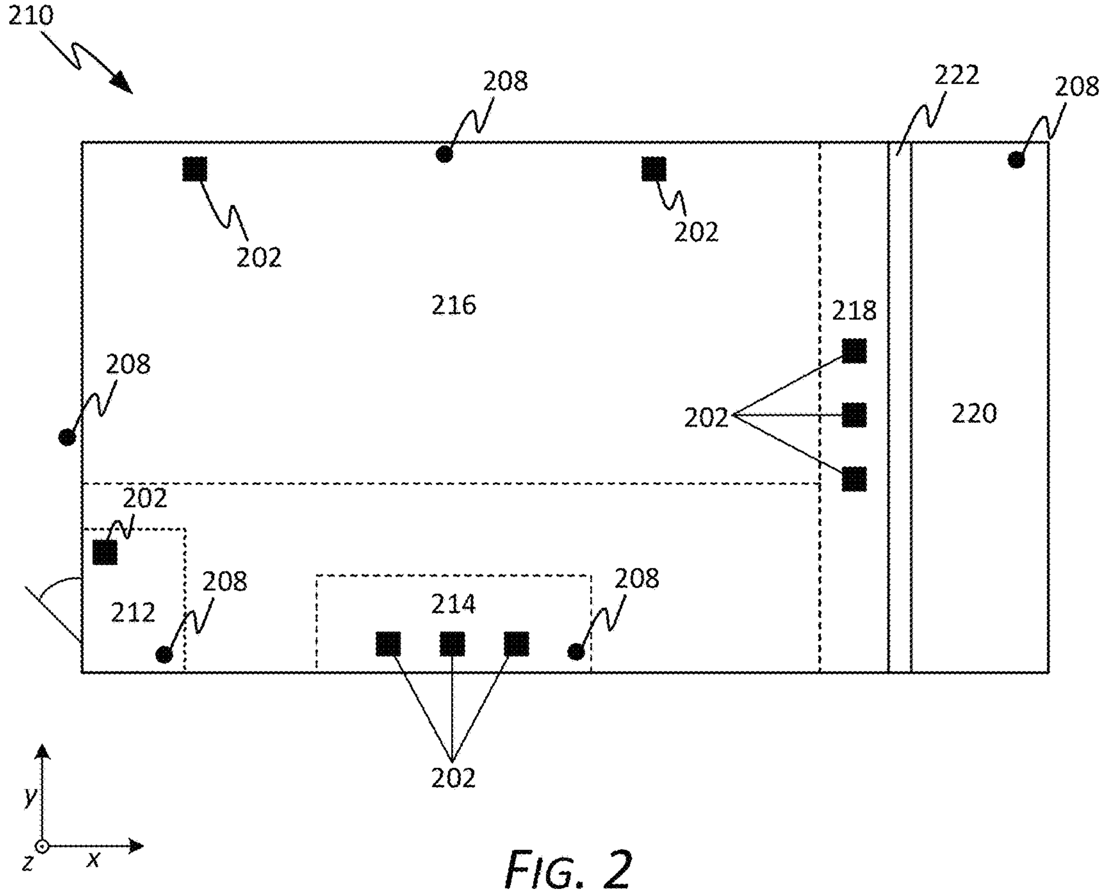
FIG. 2 illustrates a point of sale system layout in a monitored environment, in accordance with some embodiments.

FIG. 2 illustrates a monitored environment 210 in a service zone, in accordance with some embodiments of the present disclosure. Monitored environment 210 may be divided into any number of zones that may be predefined based on one or more point of sale devices implemented within each zone. One or more of the point of sale systems may be configured with passive monitoring functionality based on audio analytics that are discussed within this disclosure. Monitored environment 210 may be implemented as any environment in which point of sale systems may be implemented and user activity is to be passively monitored. Examples of monitored environment 210 may include a monitored environment such as a grocery store or a restaurant.

While monitored environment 210 is depicted with first predetermined zone 212, second predetermined zone 214, third predetermined zone 216, and fourth predetermined zone 218, it is understood that monitored environment 210 may be implemented with any number of zones which are defined by one or more point of sale systems that are implemented with audio analytic capabilities as described in this disclosure.

In some example embodiments, a point of sale system 202 can be deployed within and/or about monitored environment 210. In some embodiments, point of sale system 202 may be implemented as one or more point of sale device that are distributed in different physical locations within monitored environment 210 (e.g., a first zone corresponds toa first physical location within monitored environment 210, a second zone corresponds to a second physical location within monitored environment 210, and so on). In some embodiments, freestanding microphone 208 can be deployed in addition to or in place of point of sale systems 202 in the one or more locations within monitored environment 210 to supplement capturing sound data (e.g., the baseline sound data and/or the diagnostic sound data). In some embodiments, freestanding microphone 208 may be implemented as one or more freestanding microphones that are deployed in distributed physical locations of monitored environment 210. For example, point of sale system 202 can be deployed in a first predetermined zone 212. In some embodiments, freestanding microphone 208 can be deployed in first predetermined zone 212 and/or at an exterior of monitored environment 210. Point of sale system 202 and/or freestanding microphone 208 deployed in first predetermined zone 212 can be used to track foot traffic either entering monitored environment 210 or passing by the exterior of monitored environment 210. Tracking foot traffic passing by the exterior of monitored environment 210 can provide data to the point of sale system 202 that can be interpreted by a machine learning model, or other algorithm, as potential customers passing an establishment without entering the establishment. Here and below, references to "machine learning model" are to be regarded as short-hand for "machine learning model and/or other algorithm."

In some example embodiments, point of sale system 202 and/or freestanding microphones can be deployed at a second predetermined zone 214. Point of sale system 202 and/or freestanding microphones deployed at second predetermined zone 214 can provide, for example, self-serve customer touchscreen system input data indicating busy times for self-serve traffic and/or slow times for self-serve traffic. Recording self-serve touchscreen system input data from self-serve point of sale systems 202 can provide data to the machine learning model to interpret busy and/or slow periods in monitored environment 210. In some embodiments, self-serve touchscreen system input data from self-serve point of sale systems 202 can provide data to the machine learning model to interpret malfunctioning point of sale systems 202 or self-serve point of sale systems 202 having other issues deterring customer interaction (e.g., dirty, difficult to see, powered down, or the like). For example, an underperforming point of sale system 202 can exhibit data that the machine learning model interprets as slow (e.g., low quantity/frequency of inputs and/or low sound analytic data). The machine learning model can correlate sound analytic data from a plurality of point of sale systems 202 and report feedback data. The feedback data can be provided by transmitting the sound analytic data from each point of sale system 202 in a column format to a spreadsheet and/or graphic program embedded in the processor. The processor can in turn transmit the graphical data to a display program operating a display behind the touchscreen, a display program within a control computer communicably coupled to the processor, a smartphone application provided to management, or the like.

In some embodiments, point of sale system 202 and/or freestanding microphone 208 can be deployed in a third predetermined zone 216. Deploying point of sale system 202 and/or freestanding microphones in third predetermined zone 216 can provide input data from employees inputting orders via touchscreen/display 106 as well as sound data from customers dining in third predetermined zone 216 (e.g., a dining area). Recording touchscreen system input data from point of sale systems 202 deployed predetermined zone 216 can provide data to the machine learning model to interpret busy and/or slow periods in monitored environment 210.

In some embodiments, point of sale system 202 and/or freestanding microphones can be deployed in a fourth predetermined zone 218 that is, for example, adjacent to a fifth predetermined zone 220 (e.g., a kitchen in a restaurant). In embodiments where point of sale system 202 and/or freestanding microphones is implemented in a restaurant, fourth predetermined zone 218 (e.g., a server area in a restaurant) and fifth predetermined zone 220 (e.g., an exposition line in a restaurant) may be demarcated based on specific areas of the restaurant such as a server area or a kitchen. Point of sale system 202 may be configured with a zone identifier such that data generated by the point of sale system 202 may be tagged with the appropriate zone identifier. Tagging recorded user inputs and sound data with a zone identifier enables location-specific processing of the sound data. Deploying point of sale system 202 in fourth predetermined zone 218, adjacent to fifth predetermined zone 220 and/or sixth predetermined zone 222 can provide both input data from employees inputting information (e.g., food and/or merchandise orders) and sound data from fifth predetermined zone 220. Diagnostic sound data captured from fourth predetermined zone 218, fifth predetermined zone 220, and/or sixth predetermined zone 222 sound, similar to customer sound data, can provide data to the machine learning model to interpret busy and slow times for monitored environment 210 (e.g., a restaurant or a retail environment).

In some embodiments, the processor can be configured to output the sound analytic data to an audio analytics application. For example, the audio analytics application can be configured to receive the sound analytic data and output a graphical interpretation of the sound analytic data (e.g., a histogram, a line plot, or the like visually displaying time periods of high and low sound data generated within monitored environment 210). In some embodiments, the processor can be configured to delete the diagnostic sound data after the filtering and any other subsequent processing to maintain customer and/or employee privacy. In other embodiments, the processor can be configured to generate and transmit instructions for controlling an environmental attribute control system communicably coupled to the processor. Such instructions can be provided, for example, by a machine learning model communicably coupled to the processor and configured to analyze the sound analytic data and develop environmental control instructions as described herein.

In some embodiments, the processor can be configured to output the correlated quantity of inputs to filtered sound data, providing sound analytic data. Outputting the data correlation can allow systems, such as a server to perform audio analysis on the data and generate instructions for adjusting the environment accordingly. In some embodiments, the sound analytic data can be provided to a machine learning model, that can be installed on a point of sale system (e.g., point of sale system 202) or connected to point of sale systems over a network (e.g., in an analytic server) for interpretation. Wherever the machine learning model is implemented, the machine learning model (of other algorithm) is configured to process the sound analytic data and optionally input data recorded from touchscreen/display 106. The processor can then provide one or more instructions based on the output of the machine learning model. For example, when the data indicates a busy time (e.g., a high quantity of inputs and a high volume of activity in the monitored environment), the machine learning model can trigger a calendaring code to schedule appropriate staff to operate the monitored environment. In another example, the machine learning model can coordinate with an ordering and scheduling system to generate instructions for managing inventory and predictively order inventor to ensure that there is sufficient inventory on a day that is typically busier than other days. For example, the processor can access a supply ordering program embedded within the processor or accessed via the internet (e.g., a program supported by a vendor) to adjust supply and/or product orders accordingly. In some embodiments, the sound analytic data can be tracked over a period of time to indicate average busy times and/or slow times. For example, a monitored environment that is slower over a weekend (e.g., an in-town lunch restaurant) can use the sound analytic data, showing a low quantity of inputs and a low activity volume, to exercise restraint in ordering supplies and scheduling staff via the embedded code and/or communicably coupled programs described above.

Figure 3:
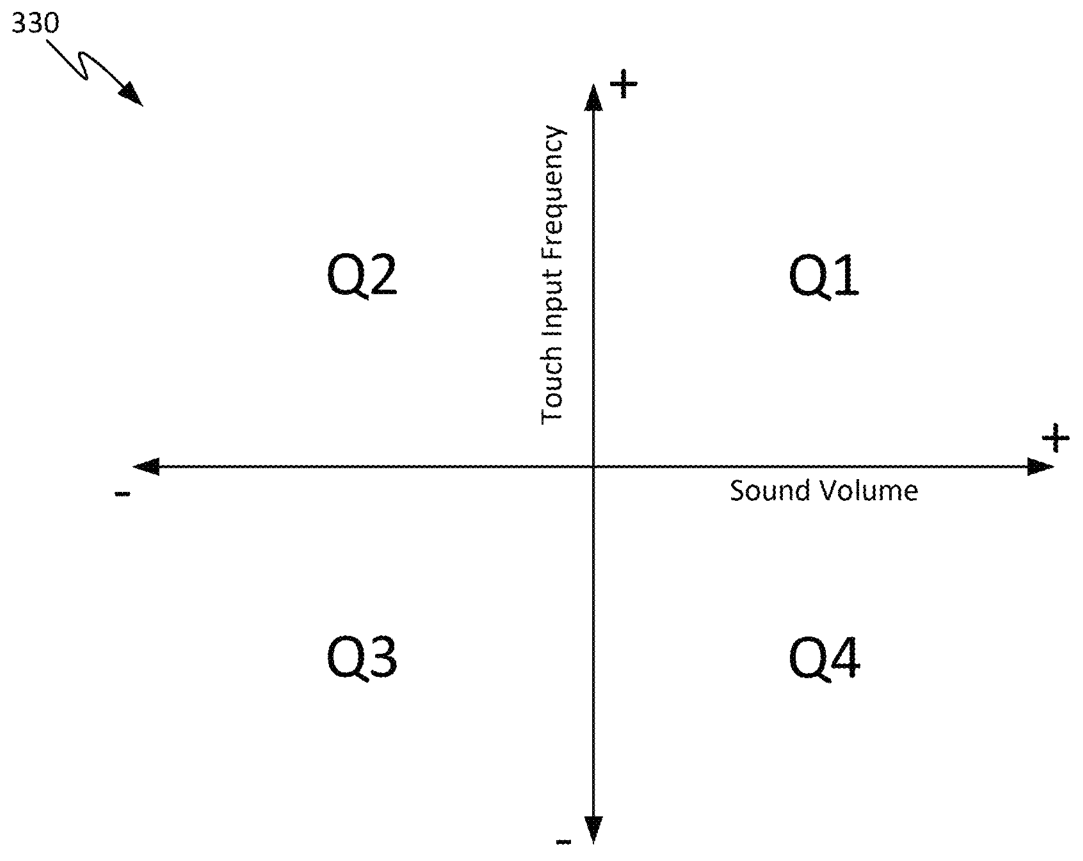
FIG. 3 illustrates an analytic plot in accordance with some embodiments.

FIG. 3 illustrates an analytic plot 330 in accordance with some embodiments. In some example embodiments, analytic plot 330 can indicate the input to sound analytic data correlation. For example, a point plotted in the first quadrant of analytic plot 330 (referred to as "Q1" in the example of FIG. 3) can indicate a high quantity of inputs (e.g., touch input frequency or number of touchscreen taps and/or swipes) and a high volume of sound in the environment surrounding point of sale system 202. In some embodiments, point of sale system 202 the volume of sound depends on the level of user activity (talking, walking, etc.) in the vicinity. Ideally, the measured sound volume would only be due to user activity. In practice, it is acceptable for measured sound volume to have some background noise unrelated to human activity. Conversely, a data point in the third quadrant (referred to as "Q3" in the example of FIG. 3) can indicate a low quantity of inputs and a low volume in the monitored environment, thus reporting a slow period for monitored environment 210. In some examples, a data point plotted in the second quadrant (referred to as "Q2" in the example of FIG. 3) can indicate a busy time in a quiet monitored environment (e.g., numerous coffee sales in a co-working environment). Additionally, a data point plotted in quadrant 4 (referred to as "Q4" in the example of FIG. 3) can indicate inputs are slow during a high volume event (e.g., a home sports team is doing well so a crowd is watching the game instead of patronizing the concessions). Data in Q4 might also be used to trigger coupons on screen or other advertisements to get people to shop. In some embodiments, analytic plot 330 can be displayed on a display behind touchscreen/display 106 via graphing code embedded in the processor. For example, the machine learning model can communicate data to the graphing code to provide a visual presentation of the data.

Figure 4A:
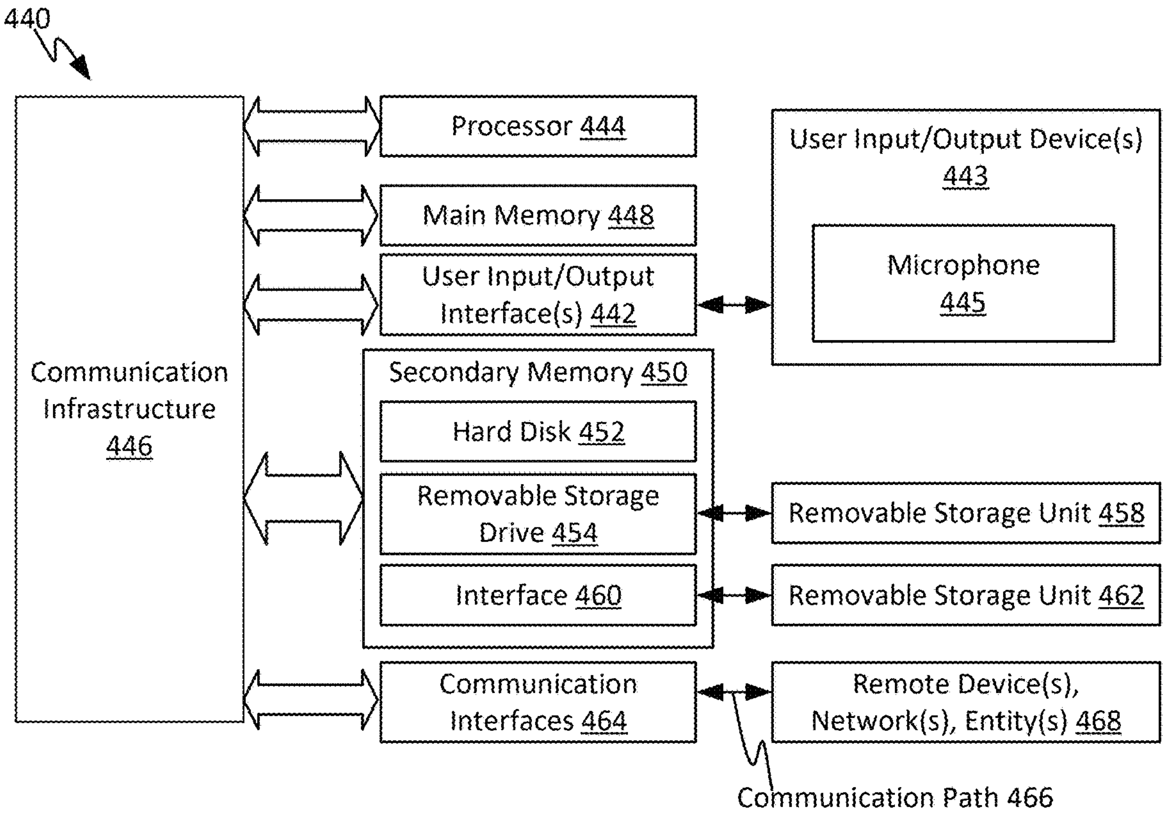
FIG. 4A is an illustration of an example computer system in which various embodiments of the present disclosure can be implemented, in accordance with some embodiments.

FIG. 4A is an illustration of an example computer system 440 in which various embodiments of the present disclosure can be implemented, according to some embodiments. Computer system 440 can be any well-known computer capable of performing the functions and operations described herein. For example, and without limitation, computer system 440 can be capable of processing the diagnostic sound data and storing the input data and performing the correlation between the sound analytic data and the input data, as described below. The computer system 440 can be used, for example, to execute one or more operations in method 570, which describes an example method for performing sound analytics.

The computer system 440 includes one or more processors (also called central processing units, or CPUs), such as a processor 444. The processor 444 is connected to a communication infrastructure or bus 446. The computer system 440 also includes input/output device(s) 443, such as point of sale system(s) 202, that communicate with communication infrastructure or the bus 446 through input/output interface(s) 442. Input/output device(s) 443 may include one or more microphone(s) 445. The computer system 440 also includes a main or primary memory 448, such as random access memory (RAM). A main memory 448 can include one or more levels of cache. The main memory 448 has stored therein control logic (e.g., computer software) and/or data. In some embodiments, the control logic (e.g., computer software) and/or data can include one or more of the operations described below with respect to method 570 of FIG. 5.

The computer system 440 can also include one or more secondary storage devices or memory 450. The secondary memory 450 can include, for example, a hard disk drive 452 and/or a removable storage device or drive 454. The removable storage drive 454 can be a floppy disk drive, a magnetic tape drive, a compact disk drive, an optical storage device, a USB memory stick (e.g., a thumb drive), a tape backup device, and/or any other storage device/drive.

The removable storage drive 454 can interact with a removable storage unit 458. The removable storage unit 458 includes a computer usable or readable storage device having stored thereon computer software (control logic) and/or data. The removable storage unit 458 can be a floppy disk, magnetic tape, compact disk, DVD, optical storage disk, USB memory stick, and/or any other computer data storage device. The removable storage drive 454 reads from and/or writes to the removable storage unit 458 in a well-known manner.

According to some embodiments, the secondary memory 450 can include other means, instrumentalities, or other approaches for allowing computer programs and/or other instructions and/or data to be accessed by the computer system 440. Such means, instrumentalities, or other approaches can include, for example, a removable storage unit 462 and an interface 460. Examples of the removable storage unit 462 and the interface 460 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. In some embodiments, the secondary memory 450, the removable storage unit 458, and/or the removable storage unit 462 can include one or more of the operations described below with respect to method 570 of FIG. 5.

The computer system 440 can further include a communication or network interface 464. The communication interface 464 enables the computer system 440 to communicate and interact with any combination of remote devices, remote networks, remote entities, etc. (individually and collectively referenced by reference number 468). For example, the communication interface 464 can allow the computer system 440 to communicate with remote devices 468 over a communications path 466, which can be wired and/or wireless, and which can include any combination of LANs, WANs, the Internet, etc. Control logic and/or data can be transmitted to and from the computer system 440 via the communication path 466.

The operations in the preceding and subsequent embodiments can be implemented in a wide variety of configurations and architectures. Therefore, some or all of the operations in the preceding embodiments—e.g., method 570 of FIG. 5—can be performed in hardware, in software or both. In some embodiments, a tangible apparatus or article of manufacture comprising a tangible computer useable or readable medium having control logic (software) stored thereon is also referred to herein as a computer program product, a program storage device, a processor, or a non-transitory computer readable medium. This includes, but is not limited to, the computer system 440, the main memory 448, the secondary memory 450, and the removable storage units 458 and 462, as well as tangible articles of manufacture embodying any combination of the foregoing. Such control logic, when executed by one or more data processing devices (such as the computer system 440), causes such data processing devices to operate as described herein.

Figure 4B:
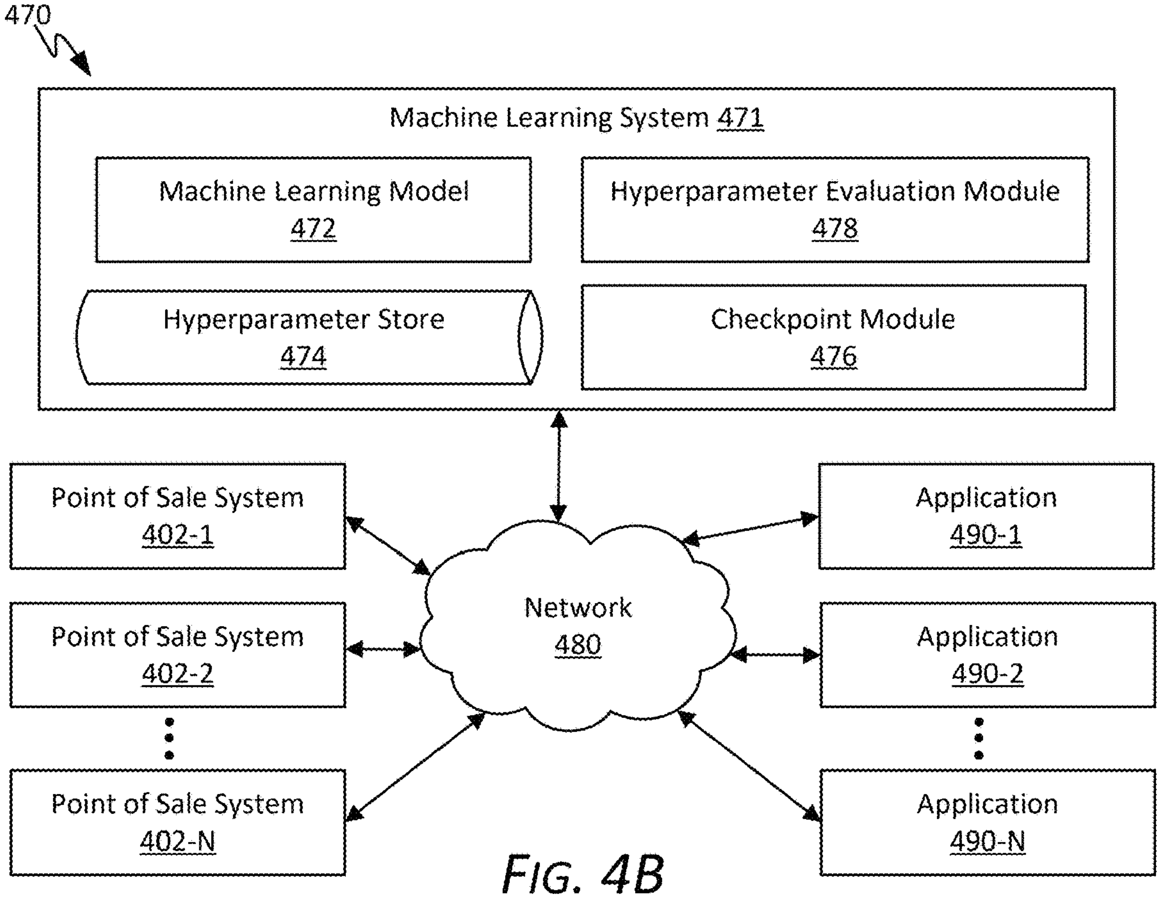
FIG. 4B is an illustration of an example machine learning environment in which various embodiments of the present disclosure can be implemented, in accordance with some embodiments.

FIG. 4B is an illustration of an example monitored environment 470 in which various embodiments of the present disclosure can be implemented, in accordance with some embodiments. Monitored environment 470 (e.g., monitored environment 210) can include a machine learning system 471 (e.g., point of sale system 102, FIG. 1) that can store a machine learning model 472, a hyperparameter store 474, a hyperparameter evaluation module 478, and a checkpoint module 476. Machine learning system 471 can also store one or more machine learning models 472, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the machine learning system 471 and various software applications or sensors of machine learning environment 470. Machine learning model 472 can also be part of a software application. Machine learning models 472 may perform various tasks such as baseline sound data filtering, sound analytic data correlation with tap frequency data, speech recognition, machine translation, voice recognition, voice command recognition, text recognition, text and context analysis, and/or other natural language processing, predictions, and instructions.

Various machine learning models 472 stored in machine learning system 471 can be fully trained, untrained, or partially trained to allow machine learning system 471 to reinforce or continue to train the machine learning models as machine learning system 471 is used. Operations of the machine learning models include various computation used in training the models and determining results in runtime using the models. For example, in one case, machine learning system 471 captures sound analytic data from the monitored environment 210 and uses the sound analytic data to continue to improve a machine learning model 472 that is used to adjust various parameters in monitored environment 210.

Hyperparameter store 474 is embodied as a memory configured to store parameters including baseline sound data, touch input frequency, data from various point of sale systems 102, data from various monitored environments 210, or the like.

Hyperparameter evaluation module 478 is embodied as one or more integrated circuit (IC) chip(s) and performs various data processing processes. Hyperparameter evaluation module 478 can include, among other subcomponents, an audio signal processor, a central processor unit (CPU), a network interface, a sensor interface (e.g, microphone 445 and/or touchscreen/display 106), a display controller, a graphics processor unit (GPU), a memory controller, a video encoder, a storage controller, and a bus connecting these subcomponents. Hyperparameter evaluation module 478 component 204 may include more or fewer subcomponents than those shown in FIG. 4B.

Checkpoint module 476 is a circuit that performs various stages of an audio processing pipeline. In some embodiments, the audio signal processor can receive sound analytic data from machine learning system 471, and process the sound analytic data into a form that is usable by other subcomponents of hyperparameter evaluation module 478 or components of machine learning system 471.

Network 480 is a subcomponent that enables data to be exchanged between systems 471 and other devices via one or more networks (e.g., carrier or agent devices). For example, audio or other sound analytic data may be received from other devices via network 480 and be stored in system secondary memory 450 for subsequent processing and display/reporting. The networks may include, but are not limited to, Local Area Networks (LANs) (e.g., an Ethernet or corporate network) and Wide Area Networks (WANs). The sound analytic data received via network 480 may undergo sound data processing processes by computer system 440.

In some embodiments, one or more point of sale systems 402-1, 402-2, up to 402-N, can be connected to machine learning system 471 via network 480. In some embodiments, machine learning system 471 can be embedded in point of sale systems 402-1 through 402-N. Point of sale systems 402-1 through 402-N can be configured to provide sound analytic data and/or touch input frequency data to machine learning system 471.

In some embodiments, one or more applications 490-1, 490-2, up to 490-N can be connected to point of sale system 402 and/or machine learning system 471 via network 480. Such applications 490-1 through 490-N can include controls for various parameters in monitored environment 210 (FIG. 2). For example, applications 490-1 through 490-N can be implemented in one or more environmental control systems to control/adjust environmental attributes that are implemented within a monitored environment 470. Examples of environmental control systems include music playback systems, HVAC control systems, advertising systems, display systems, employee scheduling systems, supply ordering systems, or the like.

Figure 5:
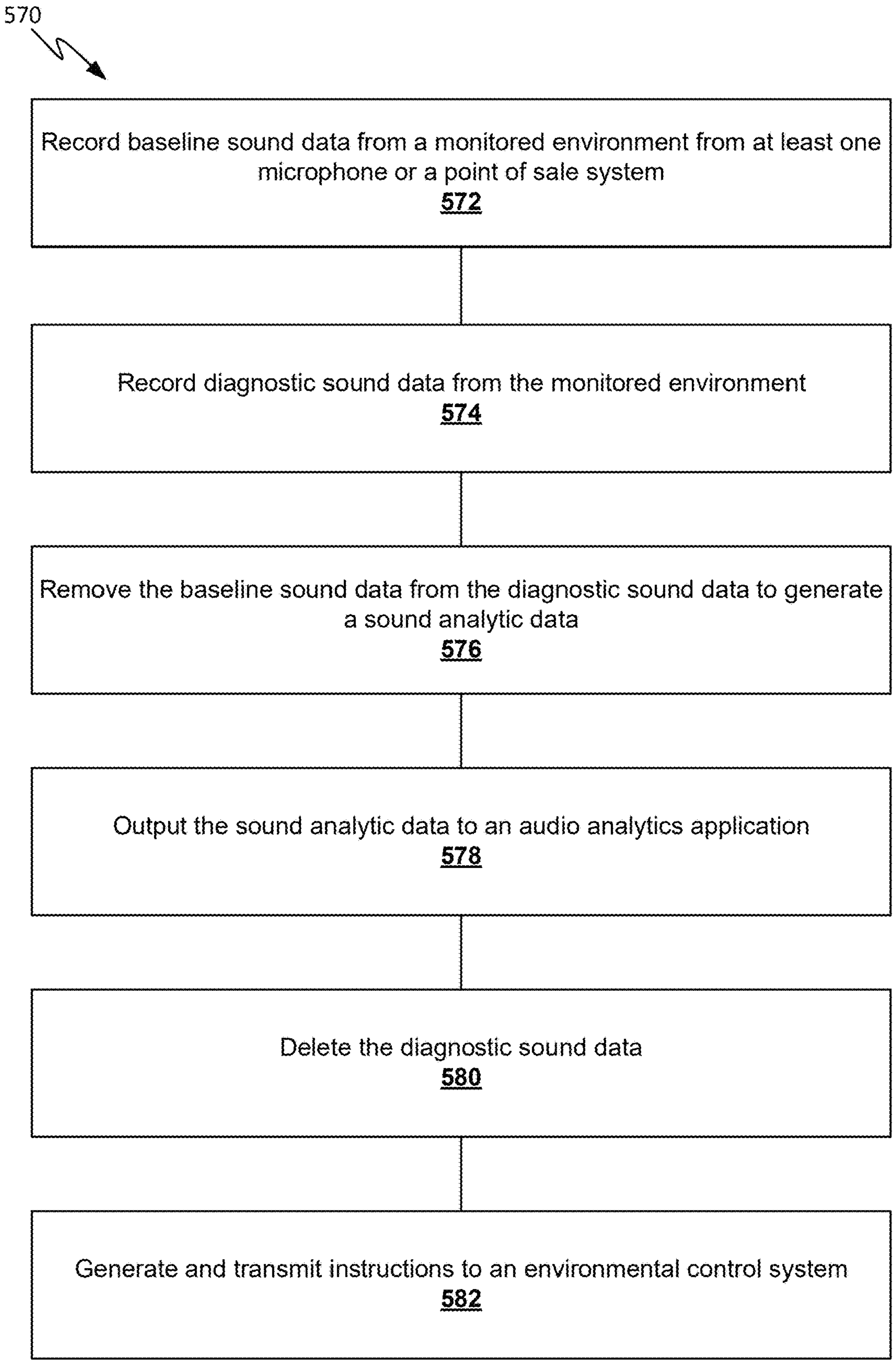
FIG. 5 is a flowchart illustrating a method of adjusting environmental conditions, in accordance with some embodiments.

In some embodiments, a method for adjusting one or more environmental conditions is described herein. Some embodiments of the method include recording a baseline sound data from a monitored environment from at least one microphone or from at least one point of sale system, recording diagnostic sound data from the monitored environment and filtering sound having a frequency greater than a predetermined conversation frequency level from the diagnostic sound data, removing the baseline sound data from the diagnostic sound data recorded from the monitored environment to generate a sound analytic data, outputting the sound analytic data to an audio analytics application, deleting the diagnostic sound data, and generating and transmitting instructions for controlling an environmental control system. In some embodiments, the method can also include receiving input data from the point of sale system and correlating the input data and the sound analytic data to provide a correlated data. In some embodiments, the correlating can performed using a processor deployed in the monitored environment and communicably coupled to the point of sale system or the at least one microphone. In some embodiments, the method can further include outputting the correlated data to the audio analytics application. In some embodiments, adjusting the environmental conditions can include adjusting music volume, heating, venting, and air conditioning (HVAC) conditions, quantity of staff, quantity of supplies, or any combination thereof. According to some embodiments, FIG. 5 illustrates a flowchart of a method 570 for adjusting environmental conditions in monitored environment 210 according to point of sale system 202. In particular, method 570 focuses on recording sound data from point of sale system 202 as referred to in the examples of FIG. 1 and FIG. 2 for illustrative purposes.

This disclosure is not limited to this operational description. Other fabrication operations can be performed between the various operations of method 570 and are omitted merely for clarity. Moreover, not all operations may be needed to perform the disclosure provided herein. Additionally, some of the operations may be performed simultaneously, or in a different order than the ones shown in FIG. 5. In some embodiments, one or more other operations may be performed in addition to or in place of the presently described operations.

Referring to FIG. 5, method 570 begins with operation 572 and the process of recording a baseline sound data from a monitored environment from at least one microphone 108 and/or freestanding microphone 208, as in the example of FIGS. 1 and 2. For example, recording baseline sound data can include recording ambient sound emanating from the monitored environment when it is unoccupied (e.g., from predetermined zones 212, 214, 216, 218, 220, and/or 222). In some examples, ambient sound can be sound recorded in a retail space within an hour before opening or an hour after closing. Ambient sound can be sound recorded overnight in the example of an entity that is not open twenty-four hours per day. In other examples, ambient sound can be recorded during a slow business period. For example, ambient sound can be recorded over a period of about 1 hour prior to the monitored environment opening. In some embodiments, the baseline sound data can include music, heating, venting, and air conditioning (HVAC) system sound, equipment sound, or any combination thereof. The processor can be configured to remove the baseline sound data from the sound data captured from the monitored environment to generate sound analytic data, described below. Algorithms to "remove the baseline sound" can include subtracting a baseline decibel (dB) sound level from live dB sound levels and can further include complex filtering algorithms based on the frequency and time characteristics of baseline noise sources. In other words, the baseline sound data can include sound in an unoccupied, fully operating monitored environment.

At operation 574, point of sale system 202 records diagnostic sound data from a monitored environment during, for example, a peak service hour (e.g., monitored environment 210) from at least one microphone 108 and/or freestanding microphone 208, as in the example of FIG. 2. Diagnostic sound data from the monitored environment can include customer conversation, customer movement, employee conversation, employee movement, or any sound emanating from a source other than sound sources creating the baseline sound data (e.g., the ambient sound).

In some embodiments, predetermined frequency levels can be filtered from the diagnostic sound data to provide filtered sound data. For example, the predetermined frequency level can be a frequency level below which speech is unrecognizable. As a non-limiting example, a threshold frequency level of 1 kHz may be used because recording monitored environment sound at frequencies less than about 1 kHz can provide sound analytic data that is devoid of audible conversation. Accordingly, sound having frequencies greater than about 1 kHz can be removed from the diagnostic sound data. Filtering can be performed by a low-pass filter configured to block predetermined sound frequencies, e.g., frequencies greater than the 1 kHz threshold frequency level. In some embodiments, the processor disposed within the point of sale system 202 can be configured to provide the filtered sound data. For example, code embedded in the processor can digitally remove (e.g., level) frequencies greater than the threshold frequency level to provide filtered sound data having maximum frequencies less than the threshold frequency level.

At operation 576, point of sale system 202 removes the baseline sound data from the diagnostic sound data from the monitored environment (e.g., sound generated from human activity) to generate a sound analytic data. Ideally, the sound analytic data would only be due to human activity. In practice, signal processing may suppress but entirely eliminate effects of background noise unrelated to human activity. Sound data processing may include frequency domain processing as well as time-domain processing.

Accordingly, the sound analytic data is sound data produced by entities (e.g., customers, employees, movement, or the like) during an operational (e.g., open) time of the monitored environment. The baseline sound data is removed to provide an occupancy profile of the monitored environment as a function of sound analytics. In some embodiments, removing the baseline sound data from the diagnostic sound data and/or filtered sound data to generate the sound analytic data can be performed by the processor digitally subtracting the recorded baseline sound data amplitude from the recorded diagnostic and/or filtered sound data amplitude.

At operation 578, point of sale system 202 outputs the sound analytic data to an audio analytics application. For example, the audio analytics application can be configured to receive the sound analytic data and output a graphical interpretation of the sound analytic data (e.g., a histogram, a line plot, or the like visually displaying time periods of high and low sound data generated within monitored environment 210). In some embodiments, the audio analytics application can interpret the sound analytic data as a function of volume. For example, the audio analytics application can interpret sound analytic data having a high volume as a busy period in the monitored environment 210. On the other hand, the audio analytics application can interpret sound analytic data having a low volume as a slow period in the monitored environment 210.

At operation 580, point of sale system 202, e.g., using processor 444 illustrated in FIG. 4A, deletes the diagnostic sound data, the filtered sound data, and/or the sound analytic data. Deleting any and all recorded sound data can ensure privacy.

At operation 582, point of sale system 202, e.g., using processor 444 illustrated in FIG. 4A, generates and transmits instructions to an environmental control system. For example, the processor 444 can be configured to generate and transmit instructions for controlling an environmental control system communicably coupled to the processor 444. Such instructions can be provided, for example, by a machine learning model 472 communicably coupled to the processor 444 and configured to analyze the sound analytic data and develop environmental control instructions. The processor 444 can then provide one or more instructions based on the output of the machine learning model 472. For example, when the data indicates a busy time (e.g., a high volume of activity in the monitored environment 210), the machine learning model can trigger a calendaring code to schedule appropriate staff to operate the monitored environment 210. In another example, the machine learning model 472 can coordinate with an ordering and scheduling system to generate instructions for managing inventory and predictively order inventory to ensure that there is sufficient inventory on a day that is typically busier than other days. For example, the processor 444 can access a supply ordering program embedded within the processor 444 or accessed via the internet (e.g., a program supported by a vendor) to adjust supply and/or product orders accordingly. In some embodiments, the sound analytic data can be tracked over a period of time to indicate average busy times and/or slow times. For example, a monitored environment 210 that is slower over a weekend (e.g., an in-town lunch restaurant) can use the sound analytic data, showing a low activity volume, to exercise restraint in ordering supplies and scheduling staff via the embedded code and/or communicably coupled programs described above.

Figure 6:
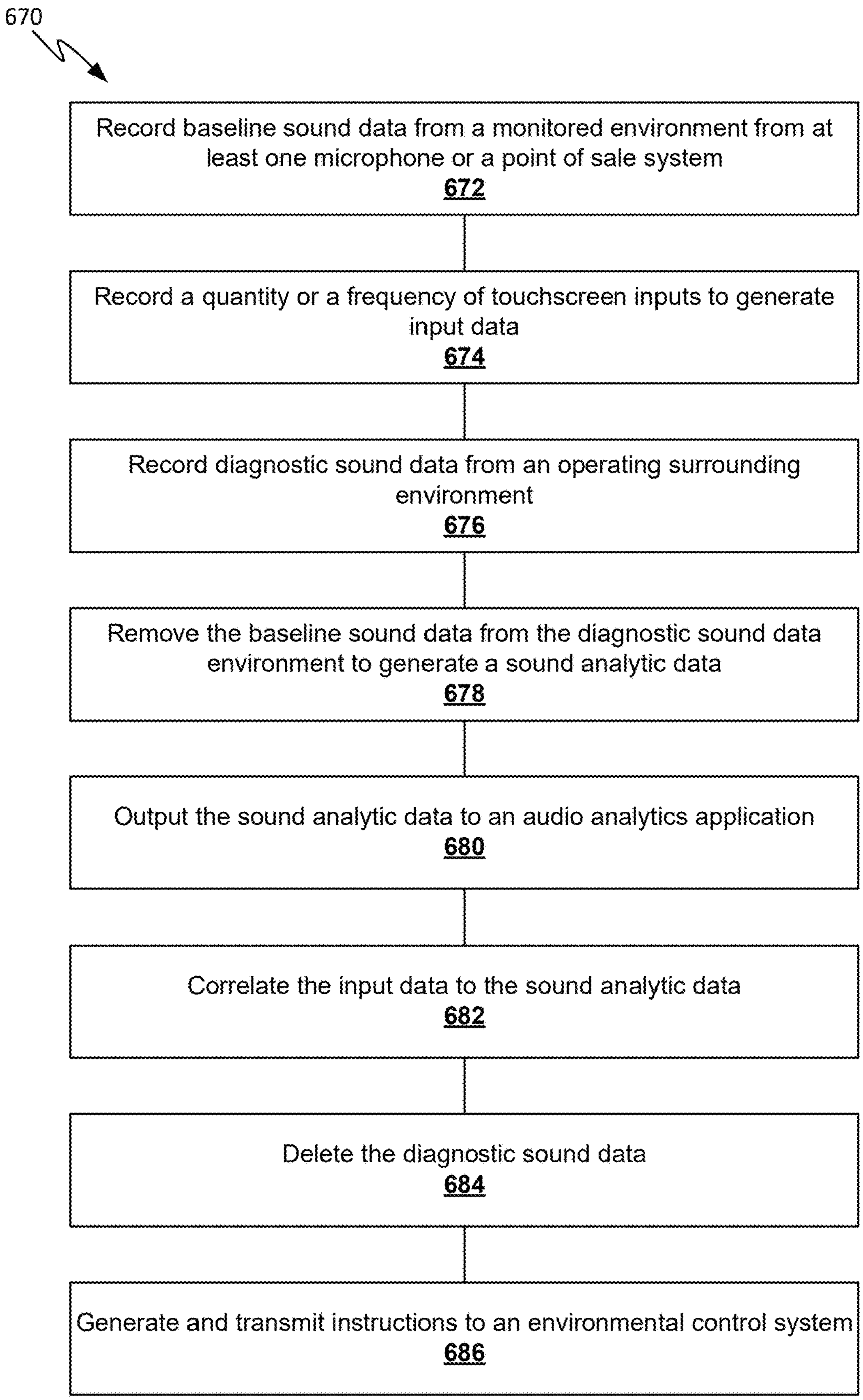
FIG. 6 is a flowchart illustrating a method of adjusting environmental conditions, in accordance with some embodiments.

According to some embodiments, FIG. 6 illustrates a flowchart of an optional method 670 for adjusting environmental conditions in monitored environment 210 according to point of sale system 202. In particular, method 670 focuses on recording input data and sound data from point of sale system 202 as referred to in the examples of FIG. 1 and FIG. 2 for illustrative purposes.

This disclosure is not limited to this operational description. Other fabrication operations can be performed between the various operations of method 670 and are omitted merely for clarity. Moreover, not all operations may be needed to perform the disclosure provided herein. Additionally, some of the operations may be performed simultaneously, or in a different order than the ones shown in FIG. 6. In some embodiments, one or more other operations may be performed in addition to or in place of the presently described operations.

Referring to FIG. 6, method 670 begins with operation 672 and the process of recording a baseline sound data from a monitored environment from at least one microphone 108 and/or freestanding microphone 208, as in the example of FIGS. 1 and 2. For example, recording baseline sound data can include recording ambient sound emanating from the monitored environment when it is unoccupied (e.g., from predetermined zones 212, 214, 216, 218, 220, and/or 222). In some examples, ambient sound can be sound recorded in a retail space within an hour before opening or an hour after closing. Ambient sound can be sound recorded overnight in the example of an entity that is not open twenty-four hours per day. In other examples, ambient sound can be recorded during a slow business period. For example, ambient sound can be recorded over a period of about 1 hour prior to the monitored environment opening. In some embodiments, the baseline sound data can include music, heating, venting, and air conditioning (HVAC) system sound, equipment sound, or any combination thereof. The processor can be configured to remove the baseline sound data from the sound data captured from the monitored environment to generate sound analytic data, described below. Algorithms to "remove the baseline sound" can include subtracting a baseline decibel (dB) sound level from live dB sound levels and can further include complex filtering algorithms based on the frequency and time characteristics of baseline noise sources. In other words, the baseline sound data can include sound in an unoccupied, fully operating monitored environment.

At operation 674, point of sale system 202 records a quantity and/or a frequency of touchscreen inputs imparted on touchscreen/display 106 (FIG. 1) to generate input data. For example, touchscreen inputs can be inputs related to a food order, a custom food order, a retail transaction, a restaurant transaction, or the like. Inputs can be a result of a finger input, a card input, a ring input, a fingernail input, a knuckle input, a stylus input, or any suitable touchscreen/display 106 (FIG. 1) inputting method or input source.

Values for input data Tn can be a count of the number of inputs occurring during the sampling interval (e.g., an input frequency).

At operation 676, point of sale system 202 records diagnostic sound data from a monitored environment during, for example, a peak service hour (e.g., monitored environment 210) from at least one microphone 108 and/or freestanding microphone 208, as in the example of FIG. 2. Diagnostic sound data from the monitored environment can include customer conversation, customer movement, employee conversation, employee movement, or any sound emanating from a source other than sound sources creating the baseline sound data (e.g., the ambient sound).

In some embodiments, predetermined frequency levels can be filtered from the diagnostic sound data to provide filtered sound data. For example, the predetermined frequency level can be a frequency level below which speech is unrecognizable. As a non-limiting example, a threshold frequency level of 1 kHz may be used because recording monitored environment sound at frequencies less than about 1 kHz can provide sound analytic data that is devoid of audible conversation. Accordingly, sound having frequencies greater than about 1 kHz can be removed from the diagnostic sound data. Filtering can be performed by a low-pass filter configured to block predetermined sound frequencies, e.g., frequencies greater than the 1 kHz threshold frequency level. In some embodiments, the processor disposed within the point of sale system 202 can be configured to provide the filtered sound data. For example, code embedded in the processor can digitally remove (e.g., level) frequencies greater than the threshold frequency level to provide filtered sound data having maximum frequencies less than the threshold frequency level.

At operation 678, point of sale system 202 removes the baseline sound data from the diagnostic sound data from the monitored environment (e.g., sound generated by human activity) to generate a sound analytic data. Ideally, the sound analytic data would only be due to human activity. In practice, signal processing may suppress but entirely eliminate effects of background noise unrelated to human activity. Sound data processing may include frequency domain processing as well as time-domain processing. Accordingly, the sound analytic data is sound data produced by entities (e.g., customers, employees, movement, or the like) during an operational (e.g., open) time of the monitored environment. The baseline sound data is removed to provide an occupancy profile of the monitored environment as a function of sound analytics. In some embodiments, removing the baseline sound data from the diagnostic sound data and/or filtered sound data to generate the sound analytic data can be performed by the processor digitally subtracting the recorded baseline sound data amplitude from the recorded diagnostic and/or filtered sound data amplitude.

At operation 680, point of sale system 202 outputs the sound analytic data to an audio analytics application. For example, the audio analytics application can be configured to receive the sound analytic data and output a graphical interpretation of the sound analytic data (e.g., a histogram, a line plot, or the like visually displaying time periods of high and low sound data generated within monitored environment 210).

At operation 682, point of sale system 202 correlates the input data from touchscreen inputs to the sound analytic data to provide sound analytic data. In some embodiments, correlating the input data and sound analytic data is time sensitive. For example, sound activity levels may be recorded at sampling times Sn and input quantities may be recorded at sampling times Tn where n is an integer from 1 to N. For example, if inputs and processed sound levels are sampled every 5 minutes (e.g., 12 samples per hour) and data is recorded for one full day (e.g., 24 hours), N would have the value N=12×24=288 samples. An example sequence of sound analytic data level and input quantity is illustrated in the Table 1 below.

TABLE 1

| Time | Sound analytic data | Input (e.g., Touch) Quantity |
|---|---|---|
| $t_n$ = 11:30 AM | $S_n$ | $T_n$ |
| $t_{n+1}$ = 11:35 AM | $S_{n+1}$ | $T_{n+1}$ |
| $t_{n+2}$ = 11:40 AM | $S_{n+2}$ | $T_{n+2}$ |
| $t_{n+3}$ = 11:45 AM | $S_{n+3}$ | $T_{n+3}$ |

In some embodiments, any suitable sampling rate and sampling duration may be used depending on the needs of the application. In some embodiments, a machine learning model can identify busier times and/or slower times and adjust the sampling rate accordingly. For example, during periods of time that are identified as slower, the machine learning model can reduce the sampling rate to eliminate unnecessary data recording. Likewise, during busier times, the machine learning model can increase the sampling rate to provide more accurate data.

The sound analytic data Sn may be reported as average sound/noise decibel (dB) intensity level averaged over the sampling period.

In some embodiments, sound analytic data can include two or more measures of sound intensity level (e.g., sound amplitude). Two or more microphones at different locations within an environment, e.g., a restaurant, may each provide a measure of sound intensity level. In some embodiments, the microphones can be disposed within point of sale system 202, or can be deployed in the monitored environment as stand-alone microphones 208 communicably coupled to the point of sale system 202.

Optionally, sound data from one microphone may be processed in more than one way. For example, one measure of sound intensity level can be selectively sensitive to customer and/or employee conversation, and another measure of sound activity level can be selectively sensitive to customer and/or employee movement. In some embodiments, microphones dedicated to movement can be deployed along a floor of monitored environment 210 and/or be equipped with a low-pass filter configured to filter out sound activity having frequencies greater than frequencies emanating from shoes contacting the floor. Likewise, microphones dedicated to recording conversation can be deployed overhead or at a height above ground corresponding to standing level and/or table level. Additionally, the microphones dedicated to recording conversation can include filters to filter out higher frequencies used to recognize speech and the frequencies generated by movement.

In some embodiments, sound data filtering can utilize a low-pass filter to exclude a predetermined conversation frequency range (e.g., >1 kHz) that can be associated with audible speech. For example, the low-pass filter may eliminate frequencies above 1 kHz, making it impossible to distinguish between the various consonant sounds of spoken language. As such, the point of sale system 202 can ensure customer and/or employee privacy is maintained.

In some embodiments, correlating the input data and the sound analytic data can be performed in a cloud-computing environment, though it need not be. In some example embodiments, correlating the input data and the sound analytic data can be performed in a local area environment, e.g., using processor 444 illustrated in FIG. 4A that is communicably coupled to the point of sale system 202 and the at least one microphone 208. In some embodiments, correlating the input data and the sound analytic data in a local area environment can include correlating the input data and the sound analytic data from a plurality of microphones 208 and a plurality of point of sale devices 202 deployed in the monitored environment 210.

At operation 684, point of sale system 202, e.g., using processor 444 illustrated in FIG. 4A, deletes the diagnostic sound data, the filtered sound data, and/or the sound analytic data. Deleting any and all recorded sound data can ensure privacy.

At operation 686, point of sale system 202, e.g., using processor 444 illustrated in FIG. 4A, generates and transmits instructions to an environmental control system. For example, the processor 444 can be configured to generate and transmit instructions for controlling an environmental control system communicably coupled to the processor 444. Such instructions can be provided, for example, by a machine learning model 472 communicably coupled to the processor 444 and configured to analyze the sound analytic data and develop environmental control instructions. The processor 444 can then provide one or more instructions based on the output of the machine learning model 472. For example, when the data indicates a busy time (e.g., a high volume of activity in the monitored environment 210), the machine learning model can trigger a calendaring code to schedule appropriate staff to operate the monitored environment 210. In another example, the machine learning model 472 can coordinate with an ordering and scheduling system to generate instructions for managing inventory and predictively order inventory to ensure that there is sufficient inventory on a day that is typically busier than other days. For example, the processor 444 can access a supply ordering program embedded within the processor 444 or accessed via the internet (e.g., a program supported by a vendor) to adjust supply and/or product orders accordingly. In some embodiments, the sound analytic data can be tracked over a period of time to indicate average busy times and/or slow times. For example, a monitored environment 210 that is slower over a weekend (e.g., an in-town lunch restaurant) can use the sound analytic data, showing a low activity volume, to exercise restraint in ordering supplies and scheduling staff via the embedded code and/or communicably coupled programs described above.

In some embodiments, a non-transitory computer readable medium can be configured to perform the methods described above. For example, the non-transitory computer readable medium can be located in monitored environment 210 and/or within point of sale system 202 (see, e.g., FIGS. 1 and 2) and can be communicably coupled to touchscreen/display 106, at least one microphone 108, and/or freestanding microphone 208. In some embodiments, the non-transitory computer readable medium is communicably coupled to a plurality of microphones 208 and a plurality of point of sale systems 202 deployed in the monitored environment 210 (FIG. 2).

The non-transitory computer readable medium can be configured to provide instructions to implement an adjustment to the monitored environment 210. For example, the non-transitory computer readable medium can be communicably coupled to machine learning model 472 to interpret the sound analytic data and adjust the environmental conditions according to the interpretation as noted previously. In some embodiments, the sound analytic data can be transmitted to a graphing program, by the machine learning model 472, to provide a visual interpretation of the sound analytic data. In some examples, the sound analytic data can indicate a slow period of monitored environment 210 (e.g., data points falling with Q3 of the example plot shown in FIG. 3) or a regular time period exhibiting an average slow period. Machine learning model 472 can, for example, decrease the number of staff during the slow period by updating the calendaring program embedded within the processor and transmitting an updated schedule to touchscreen/display 106, smartphone applications provided to staff members, management, or the like. In some examples, the machine learning model 472 can adjust the heating and/or air conditioning of a predetermined zone by transmitting a command code to a LAN thermostat communicably coupled to point of sale system 202 to provide an atmosphere to attract customers. In some examples, the machine learning model 472 can update an ordering spreadsheet based on the sound analytic data, and place supply orders as needed by transmitting the updated spreadsheet to the appropriate vendor(s).

In some embodiments, in the example of a chain or franchised business, point of sale system 202 can leverage a global network of point of sale systems 202 to tune output settings, modify settings, provide instructions, or the like. In some embodiments, the machine learning model can receive the correlation data (e.g., the correlated input data and sound analytic data) from one or a plurality of point of sale systems 202 via internet download and store data from remote point of sale systems 202 on a local memory device. For example, a nationwide chain service entity (e.g., a restaurant chain, a retail sales chain, or the like) can deploy point of sale system 202 in any one of, several of, regionally, or all of its chain locations (franchised or not franchised). Accordingly, the machine learning model 472 can correlate sound analytic data from a predetermined plurality of point of sale systems 202 and provide graphical interpretations of performance of each location and/or each individual point of sale system 202. In some embodiments, the machine learning model 472 can transmit the sound analytic data to a warehousing/distribution module to adjust distribution of goods and/or supplies across the chain by way of transmitting an updated supply and/or product spreadsheet. In some examples, the machine learning model 472 can interpret regional correlation data, and can incorporate other variables including weather, regionally popular items (e.g., menu items, sales items, or the like), and/or regionally available items.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

As used herein, the terms "invention," "the invention," "this invention," and "the present invention" are intended to refer broadly to all of the subject matter of this patent application and the claims below. Statements containing these terms should be understood not to limit the subject matter described herein or to limit the meaning or scope of the patent claims below.

The breadth and scope of the invention should not be limited by any of the above-described exemplary embodiments, but should be defined only in accordance with the following claims and their equivalents.

What is claimed is:

1. A sound analytic system, comprising:
- a plurality of point of sale systems disposed in a monitored environment, the plurality of point of sale systems comprising a first point of sale system and a second point of sale system;
- a plurality of microphones configured to capture a diagnostic sound data from the monitored environment, the plurality of microphones comprising a first microphone and a second microphone, the monitored environment comprising a plurality of zones including a first zone and a second zone, wherein the first point of sale system and the first microphone are associated with the first zone, and the second point of sale system and the second microphone are associated with the second zone, wherein the first zone comprises a first physical location within the monitored environment and the second zone comprises at least a second physical location within the monitored environment; and
- a processor communicably coupled to the plurality of point of sale systems and the plurality of microphones, the processor configured to:
  - receive the diagnostic sound data from the plurality of microphones;
  - generate a sound analytic data based on the diagnostic sound data corresponding to sound received from the first microphone in the first zone and received from the second microphone in the second zone;
  - output the sound analytic data to an audio analytics application embedded within the processor, the audio analytics application configured to interpret the sound analytic data as a function of volume;
  - delete the diagnostic sound data after the generating the sound analytic data;
  - generate instructions for controlling an environmental attribute control system communicably coupled to the processor based on the sound analytic data interpreted by the audio analytics application; and
  - transmit the instructions to the environmental attribute control system to adjust an environmental attribute based on the interpreted sound analytic data.

2. The sound analytic system of claim 1, wherein the point of sale system comprises a user interface device.

3. The sound analytic system of claim 2, wherein the user interface device comprises a touchscreen display device.

4. The sound analytic system of claim 1, wherein at least one microphone comprises a low pass filter configured to filter frequencies greater than a predetermined conversation frequency level from the diagnostic sound data.

5. The sound analytic system of claim 1, wherein the processor further comprises a digital signal processing unit configured to filter frequencies greater than a predetermined conversation frequency level from the diagnostic sound data.

6. The sound analytic system of claim 1, wherein the processor is further configured to record baseline sound data from the plurality of microphones.

7. The sound analytic system of claim 6, wherein the baseline sound data comprises sound recorded from the monitored environment comprising music, heating, venting, and air conditioning (HVAC) system sound, equipment sound, or any combination thereof.

8. The sound analytic system of claim 7, wherein the processor is further configured to remove the baseline sound data from the diagnostic sound data generated by the processor to generate the sound analytic data.

9. The sound analytic system of claim 1, wherein the processor is further configured to incorporate a machine learning model to implement environmental adjustments.

10. A method for adjusting one or more environmental conditions, comprising:
- recording a baseline sound data from a monitored environment from a plurality of microphones or from a plurality of point of sale systems, the plurality of microphones comprising a first microphone and a second microphone, the plurality of point of sale systems comprising a first point of sale system and a second point of sale system, the monitored environment comprising a plurality of zones including a first zone and a second zone, wherein the first point of sale system and the first microphone are associated with the first zone, and the second point of sale system and the second microphone are associated with the second zone;
- recording diagnostic sound data from the monitored environment, wherein the recording diagnostic sound data from the monitored environment comprises recording sound generated from the first zone, wherein the first zone comprises a first physical location within the monitored environment and the second zone comprises at least a second physical location within the monitored environment;
- removing the baseline sound data from the diagnostic sound data recorded from the monitored environment to generate a sound analytic data corresponding to the sound generated from the first zone and the second zone;
- outputting the sound analytic data to an audio analytics application embedded within a processor, the audio analytics application configured to interpret the sound analytic data as a function of volume;
- deleting the diagnostic sound data; and
- generating instructions for controlling an environmental attribute control system communicably coupled to the processor based on the sound analytic data interpreted by the audio analytics application; and
- transmitting the instructions to the environmental attribute control system to adjust an environmental attribute based on the interpreted sound analytic data.

11. The method for adjusting the one or more environmental conditions of claim 10, further comprising filtering frequencies greater than a predetermined conversation frequency level from the diagnostic sound data.

12. The method for adjusting the one or more environmental conditions of claim 10, further comprising receiving input data from the plurality of point of sale systems.

13. The method for adjusting the one or more environmental conditions of claim 12, further comprising correlating the input data and the sound analytic data to provide a correlated data.

14. The method for adjusting the one or more environmental conditions of claim 13, wherein the correlating is performed using the processor deployed in the monitored environment and communicably coupled to the plurality of point of sale systems or at least one microphone.

15. The method for adjusting the one or more environmental conditions of claim 13, further comprising outputting the correlated data to the audio analytics application.

16. The method for adjusting the one or more environmental conditions of claim 10, wherein adjusting the one or more environmental conditions comprises adjusting music volume, heating, venting, and air conditioning (HVAC) conditions, quantity of staff, quantity of supplies, or any combination thereof.

17. A non-transitory computer readable medium configured to:

record a baseline sound data from a monitored environment from a plurality of microphones disposed in the monitored environment, the plurality of microphones comprising a first microphone and a second microphone, the monitored environment comprising a plurality of zones including a first zone and a second zone, wherein the first microphone is associated with the first zone, and the second microphone is associated with the second zone;

record a diagnostic sound data from the monitored environment generated from the first zone, wherein the first zone comprises a first physical location within the monitored environment and the second zone comprises a second physical location within the monitored environment;

remove the baseline sound data from the diagnostic sound data recorded from the monitored environment to generate a sound analytic data corresponding to sound generated from the first zone and the second zone;

output the sound analytic data to an audio analytics application embedded within a processor, the audio analytics application configured to interpret the sound analytic data as a function of volume;

delete the diagnostic sound data after the generating the sound analytic data;

generate instructions for controlling an environmental attribute control system communicably coupled to the processor based on the sound analytic data interpreted by the audio analytics application; and transmit the instructions to the environmental attribute control system to adjust an environmental attribute based on the interpreted sound analytic data.

18. The non-transitory computer readable medium of claim 17, wherein the non-transitory computer readable medium is further configured to filter out sound data from the diagnostic sound data having a frequency greater than a predetermined conversation level to generate a filtered sound data.

19. The non-transitory computer readable medium of claim 17, wherein the non-transitory computer readable medium is further communicably coupled to a point of sale device comprising a touchscreen user interface.

20. The non-transitory computer readable medium of claim 19, wherein the non-transitory computer readable medium is further configured to record user input data from the point of sale device and correlate the user input data to the sound analytic data.

* * * * *